(12) United States Patent
Nakamura (10) Patent No.: US 9,348,213 B2
(45) Date of Patent: May 24, 2016

(54) ULTRASONIC TRANSDUCER, ULTRASONIC PROBE, DIAGNOSTIC INSTRUMENT, AND ELECTRONIC INSTRUMENT

(71) Applicant: SEIKO EPSON CORPORATION, Tokyo (JP)

(72) Inventor: Tomoaki Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 453 days.

(21) Appl. No.: 13/737,120

(22) Filed: Jan. 9, 2013

(65) Prior Publication Data

US 2013/0176816 A1  Jul. 11, 2013

(30) Foreign Application Priority Data

Jan. 11, 2012  (JP) ................................. 2012-002988

(51) Int. Cl.
*G03B 42/06* (2006.01)
*G10K 9/125* (2006.01)
*B06B 1/06* (2006.01)
*G10K 11/32* (2006.01)

(52) U.S. Cl.
CPC .............. *G03B 42/06* (2013.01); *B06B 1/0629* (2013.01); *G10K 9/125* (2013.01); *G10K 11/32* (2013.01)

(58) Field of Classification Search
CPC ......... G01S 15/42; G01S 15/00; G01K 11/28; G01K 11/00
USPC .................................... 367/97–151
See application file for complete search history.

(56) References Cited

U.S. PATENT DOCUMENTS

| | | | | |
|---|---|---|---|---|
| 3,474,402 | A * | 10/1969 | Bealor, Jr. et al. | 367/155 |
| 4,433,396 | A * | 2/1984 | Johnson et al. | 367/105 |
| 6,656,136 | B1 | 12/2003 | Weng et al. | |
| 7,063,666 | B2 | 6/2006 | Weng et al. | |
| 7,319,672 | B2 | 1/2008 | Ashwood Smith | |
| 8,110,963 | B2 | 2/2012 | Funasaka et al. | |
| 8,137,274 | B2 | 3/2012 | Weng et al. | |
| 2004/0106880 | A1 | 6/2004 | Weng et al. | |
| 2006/0235300 | A1 | 10/2006 | Weng et al. | |
| 2007/0179379 | A1 | 8/2007 | Weng et al. | |
| 2007/0239024 | A1 * | 10/2007 | Eberle et al. | 600/459 |
| 2011/0021913 | A1 | 1/2011 | Weng et al. | |
| 2011/0118602 | A1 | 5/2011 | Weng et al. | |
| 2011/0178445 | A1 | 7/2011 | Weng et al. | |
| 2011/0227449 | A1 | 9/2011 | Nakamura | |
| 2012/0059258 | A1 | 3/2012 | Weng et al. | |
| 2012/0099404 | A1 | 4/2012 | Funasaka et al. | |
| 2012/0108967 | A1 | 5/2012 | Weng et al. | |

FOREIGN PATENT DOCUMENTS

| | | |
|---|---|---|
| JP | 58-017361 A | 2/1983 |
| JP | 61-033585 U | 2/1986 |
| JP | 02-093362 A | 4/1990 |
| JP | 06-066637 U | 9/1994 |

(Continued)

*Primary Examiner* — Luke Ratcliffe
(74) *Attorney, Agent, or Firm* — Global IP Counselors, LLP (57) ABSTRACT

An ultrasonic transducer includes a first flexible substrate, a plurality of ultrasonic elements and a substrate deforming part. The ultrasonic elements are disposed on the first flexible substrate, and configured and arranged to transmit and receive ultrasonic waves. The substrate deforming part is configured and arranged to flex the first flexible substrate in a first direction and in a second direction that intersects with the first direction.

15 Claims, 7 Drawing Sheets

(56) References Cited

FOREIGN PATENT DOCUMENTS

| JP | 07-037111 U | 7/1995 |
| JP | 2001-037760 A | 2/2001 |
| JP | 2004-089357 A | 3/2004 |
| JP | 2004-512856 A | 4/2004 |
| JP | 2009-247511 A | 10/2009 |
| JP | 2010-165341 A | 7/2010 |
| JP | 2011-217351 A | 10/2011 |
| JP | 2012-010896 A | 1/2012 |

\* cited by examiner

ULTRASONIC TRANSDUCER, ULTRASONIC PROBE, DIAGNOSTIC INSTRUMENT, AND ELECTRONIC INSTRUMENT

CROSS-REFERENCE TO RELATED APPLICATIONS

This application claims priority to Japanese Patent Application No. 2012-002988 filed on Jan. 11, 2012. The entire disclosure of Japanese Patent Application No. 2012-002988 is hereby incorporated herein by reference.

BACKGROUND

1. Technical Field

The present invention relates to an ultrasonic transducer, an ultrasonic probe, a diagnostic instrument, and an electronic instrument.

2. Related Art

An ultrasonic transducer comprising a plurality of ultrasonic elements arranged in matrix format is known. The ultrasonic elements of this ultrasonic transducer use piezoelectric bodies that are rectangular in shape. Beam forming is accomplished by separately driving ultrasonic elements that are aligned in the direction of the shorter dimension of the piezoelectric elements. Although the resolution (azimuth resolution) in the direction of the short dimension of the piezoelectric body, i.e., the azimuth direction, is increased, a load is imposed on a processing circuit because the drive state of each of the ultrasonic elements must be controlled independently. Meanwhile, it is necessary to provide an acoustic lens in order to improve the resolution (slice resolution) in the direction of the longer dimension of the piezoelectric bodies, i.e., the slice direction, and the position of a focal point of the optical transducer is determined by the acoustic lens.

Japanese Laid-Open Patent Publication No. 2004-512856 discloses an ultrasonic transducer configured such that the position of the focal point can be changed. With this ultrasonic transducer, the position of the focal point can be changed by flexing a substrate on which an ultrasonic element is provided such that the direction of a line segment perpendicular to an emission surface of the ultrasonic element changes.

SUMMARY

However, with the ultrasonic transducer presented in the above mentioned publication, the substrate can only be flexed in one direction and, thus, the direction of the line segment perpendicular to the emission surface of the piezoelectric element can only be changed in one direction. Consequently, the focal point of the ultrasonic transducer can only be changed in one direction.

The object of the present invention is to provide an ultrasonic transducer, an ultrasonic probe, a diagnostic instrument, and an electronic instrument in which the direction of the line segment perpendicular to the emission surface of the ultrasonic element can be changed by flexing a first flexible substrate in a first direction and in a second direction.

In order to achieve the aforementioned object, an ultrasonic transducer according to one aspect of the present invention includes a first flexible substrate, a plurality of ultrasonic elements and a substrate deforming part. The ultrasonic elements are disposed on the first flexible substrate, and configured and arranged to transmit and receive ultrasonic waves. The substrate deforming part is configured and arranged to flex the first flexible substrate in a first direction and in a second direction that intersects with the first direction.

As a result, the first flexible substrate can be flexed in the first direction and the second direction and the position of the focal point of the ultrasonic transducer can be adjusted in two directions.

In the ultrasonic transducer according to the above described aspect of the present invention, the substrate deforming part preferably includes a first deforming section configured and arranged to flex the first flexible substrate in the first direction, and a second deforming section configured and arranged to flex the first flexible substrate in the second direction.

In the ultrasonic transducer according to the above described aspect of the present invention, the substrate deforming part is preferably configured and arranged to flex the first flexible substrate in at least one of the first direction and the second direction such that a direction of a line segment perpendicular to an emission surface of at least one of the ultrasonic elements changes. Thus, the direction of the line segment perpendicular to the emission surface of the ultrasonic element can be changed by flexing the first substrate in the first direction and the second direction. As a result, the position of the focal point of the ultrasonic transducer can be adjusted in two directions.

In the ultrasonic transducer according to the above described aspect of the present invention, the substrate deforming part is preferably configured and arranged to flex the first flexible substrate in at least one of the first direction and the second direction such that a relative direction and a relative position between at least two of the ultrasonic elements change. Thus, an attitude (orientation) of the ultrasonic elements can be changed by flexing the substrate in the first direction and the second direction. As a result, the position of the focal point of the ultrasonic transducer can be adjusted in two directions.

In the ultrasonic transducer according to the above described aspect of the present invention, each of the first deforming section and the second deforming section preferably includes a piezoelectric element configured and arranged to elongate or contract to flex the first flexible substrate. As a result, the first flexible substrate can be flexed reliably. In the ultrasonic transformer according to the above described aspect of the present invention, each of the first deforming section and the second deforming section preferably includes a substrate heating section configured and arranged to heat and expand the first flexible substrate. As a result, the first flexible substrate can be flexed reliably.

In the ultrasonic transducer according to the above described aspect of the present invention, the substrate deforming part is preferably provided farther outward than a region where the ultrasonic elements are arranged in a plan view as viewed along a thickness direction of the first flexible substrate. As a result, the first flexible substrate can be flexed reliably.

The ultrasonic transducer according to the above described aspect of the present invention preferably further includes a second flexible substrate attached to one side of the first flexible substrate opposite from a side the ultrasonic elements are provided. The substrate deforming part is preferably configured and arranged to flex the second flexible substrate in order to flex the first flexible substrate. As a result, the first substrate can be flexed without providing a substrate deforming part on the first substrate.

The ultrasonic transducer according to the above described aspect of the present invention preferably further includes a second flexible substrate attached to one side of the first flexible substrate opposite from a side the ultrasonic elements are provided, the second flexible substrate having a larger thermal expansion coefficient than the first flexible substrate. The substrate deforming part preferably includes a substrate heating unit configured and arranged to heat and expand the second flexible substrate in order to flex the first flexible substrate.

As a result, the first substrate can be flexed reliably.

The ultrasonic transducer according to the above described aspect of the present invention preferably further includes a second flexible substrate attached to one side of the first flexible substrate opposite from a side the ultrasonic elements are provided. The substrate deforming part preferably includes a pulling mechanism configured and arranged to pull a center portion of the second flexible substrate toward a direction away from the first flexible substrate in order to flex the first flexible substrate.

As a result, the first substrate can be flexed reliably.

In the ultrasonic transducer according to the above described aspect of the present invention, the ultrasonic elements are preferably aligned along the first direction. In this way, the position of the focal point of the ultrasonic transducer can be adjusted reliably.

In the ultrasonic transducer according to the above described aspect of the present invention, the ultrasonic elements are preferably aligned along the second direction. In this way, the position of the focal point of the ultrasonic transducer can be adjusted reliably.

In the ultrasonic transducer according to the above described aspect of the present invention, the first direction is preferably perpendicular to the second direction. In this way, control can be accomplished more easily and an ultrasonic transducer having good performance can be achieved.

An ultrasonic probe according to another aspect of the present invention includes the ultrasonic transducer according to the above described aspects of the present invention and a case in which the ultrasonic transducer is housed. In this way, it is possible to obtain an ultrasonic probe that can exhibit the previously explained effects.

A diagnostic instrument according to another aspect of the present invention includes an ultrasonic transducer according to the above described aspects of the present invention, a case in which the ultrasonic transducer is housed, a device main unit having a signal processing section configured to execute signal processing based on a signal transmitted from the ultrasonic transducer to generate image data, and an image display section configured and arranged to display an image based on the image data.

In this way, it is possible to obtain a diagnostic instrument that can exhibit the previously explained effects.

An electronic instrument according to another aspect of the present invention includes an ultrasonic transducer according to the above described aspects of the present invention, a case in which the ultrasonic transducer is housed, and a device main unit having a signal processing section configured to execute signal processing based on a signal transmitted from the ultrasonic transducer.

In this way, it is possible to obtain an electronic instrument that can exhibit the previously explained effects.

BRIEF DESCRIPTION OF THE DRAWINGS

Referring now to the attached drawings which form a part of this original disclosure.

DETAILED DESCRIPTION OF EXEMPLARY EMBODIMENTS

An ultrasonic transducer, an ultrasonic probe, a diagnostic instrument, and an electronic instrument according to the present invention will now be explained based on preferred embodiments shown in the appended drawings.

First Embodiment

Figure 1:
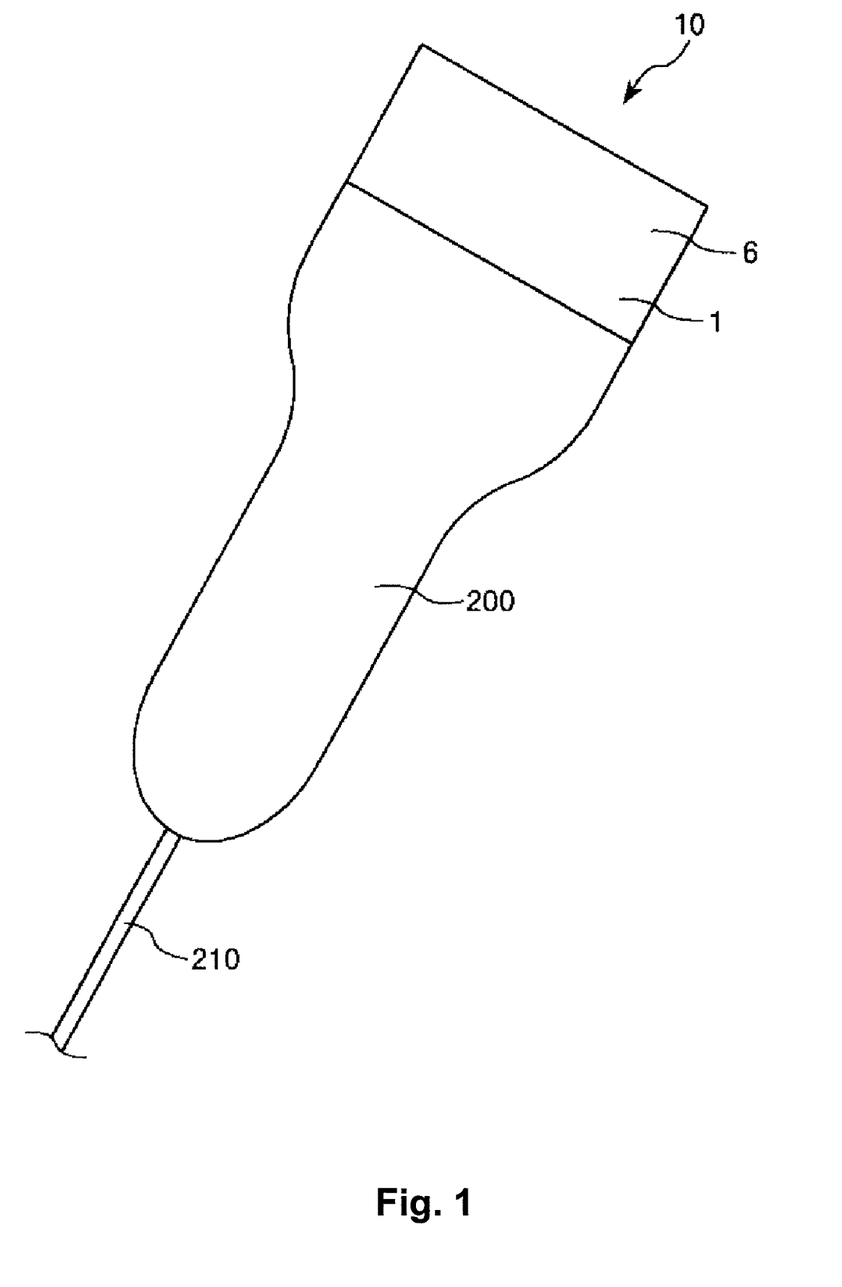
FIG. 1 is a perspective view of an ultrasonic probe according to a first embodiment of the present invention.
Figure 2:
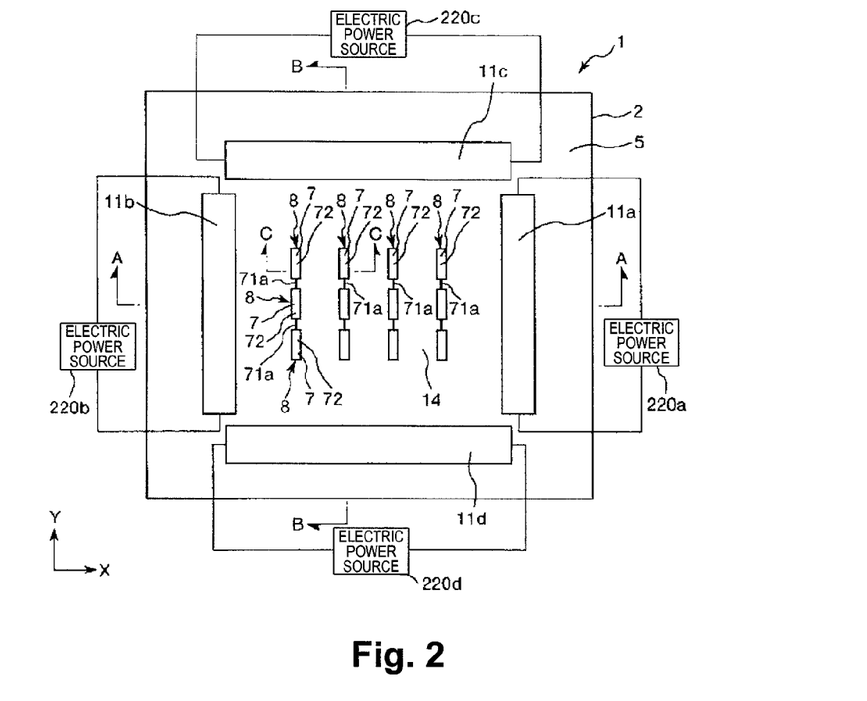
FIG. 2 is a plan view showing an ultrasonic transducer of the ultrasonic probe shown in FIG. 1 according to the first embodiment.
Figure 3:
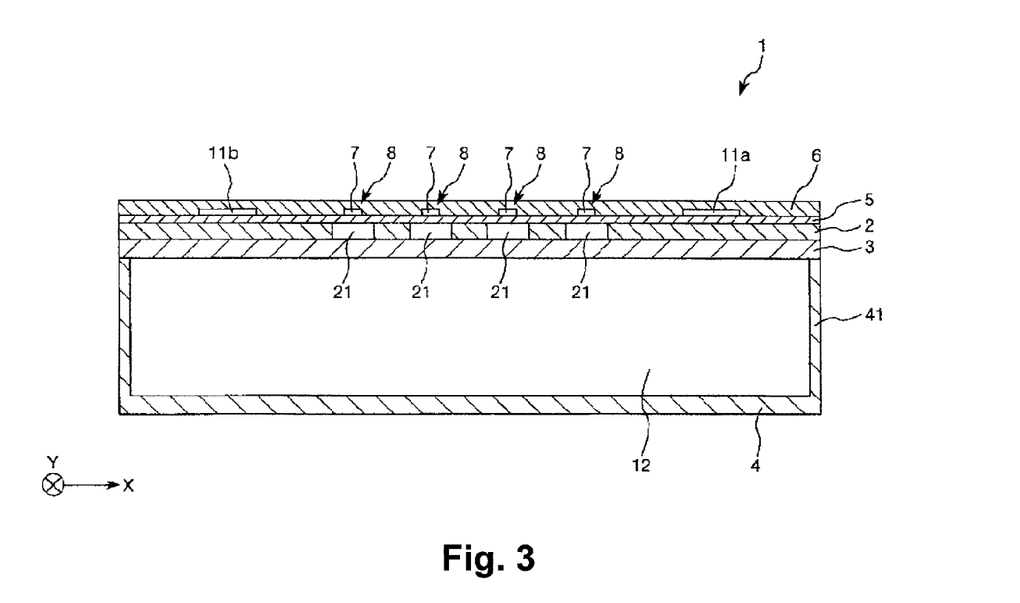
FIG. 3 is a cross sectional view of the ultrasonic transducer taken along a section line A-A of FIG. 2.
Figure 4:
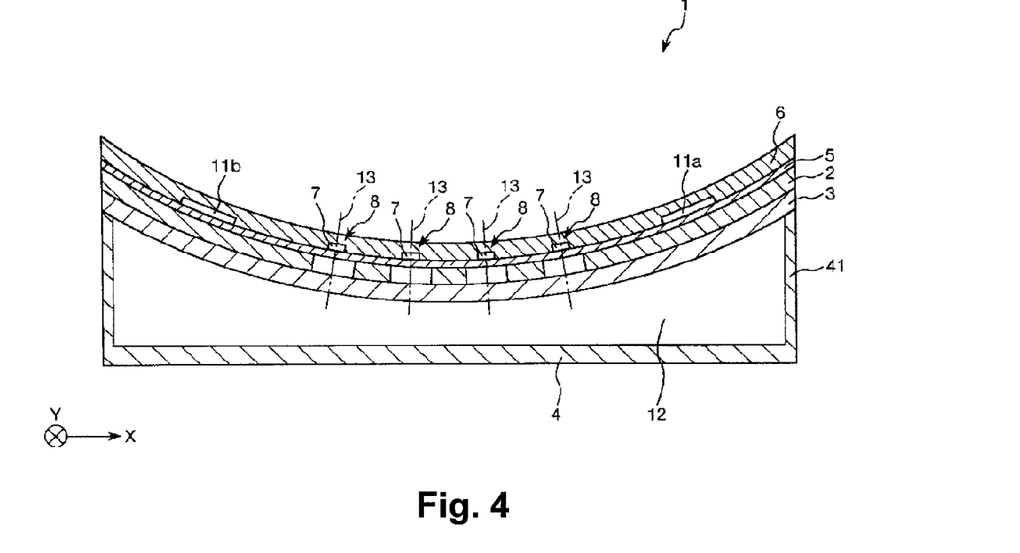
FIG. 4 is a cross sectional view of the ultrasonic transducer taken along section line A-A in FIG. 2 for explaining the operation of the ultrasonic transducer shown in FIG. 2.
Figure 5:
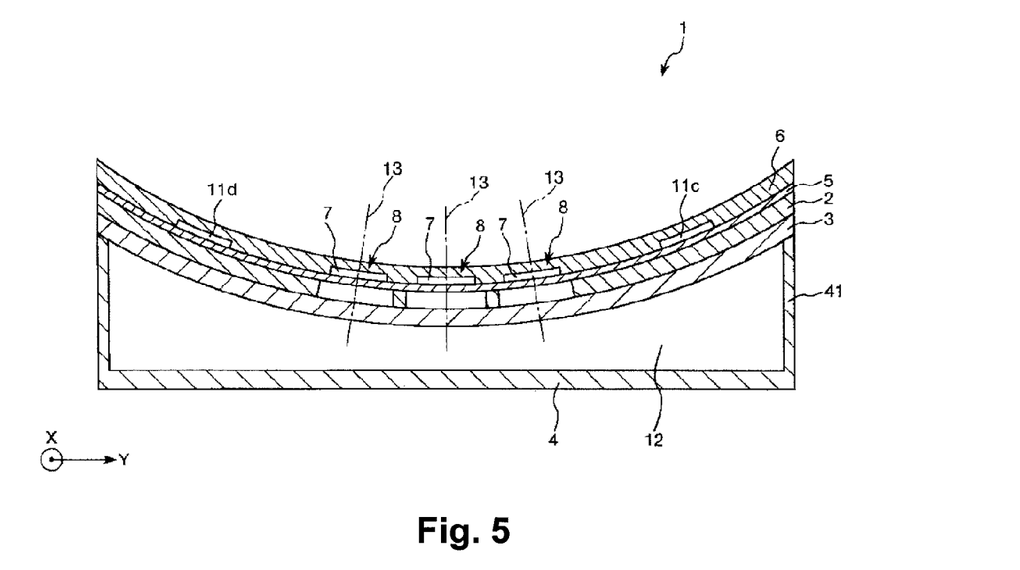
FIG. 5 is a cross sectional view of the ultrasonic transducer taken along a section line B-B in FIG. 2 for explaining the operation of the ultrasonic transducer shown in FIG. 2.
Figure 6:
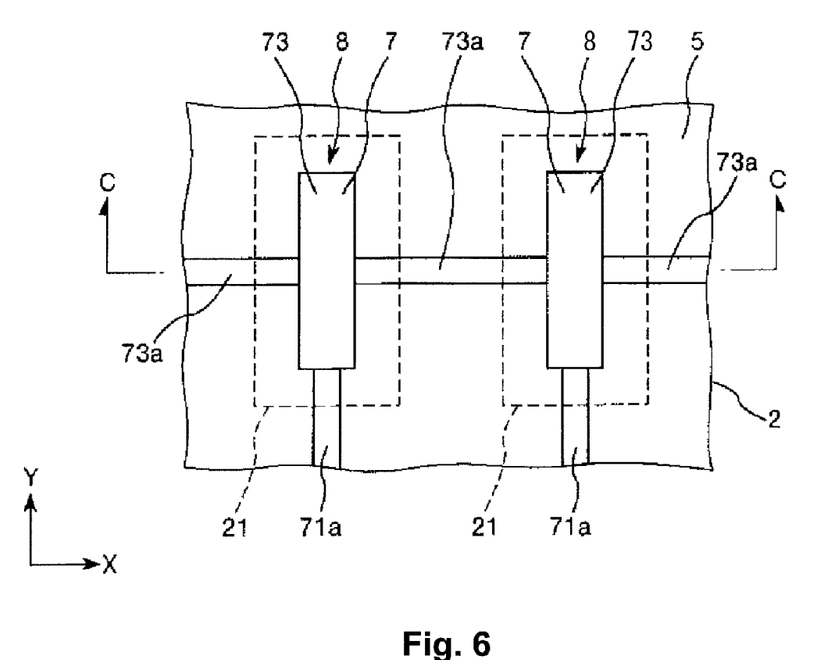
FIG. 6 is an enlarged plan view showing a portion of the ultrasonic transducer shown in FIG. 2.
Figure 7:
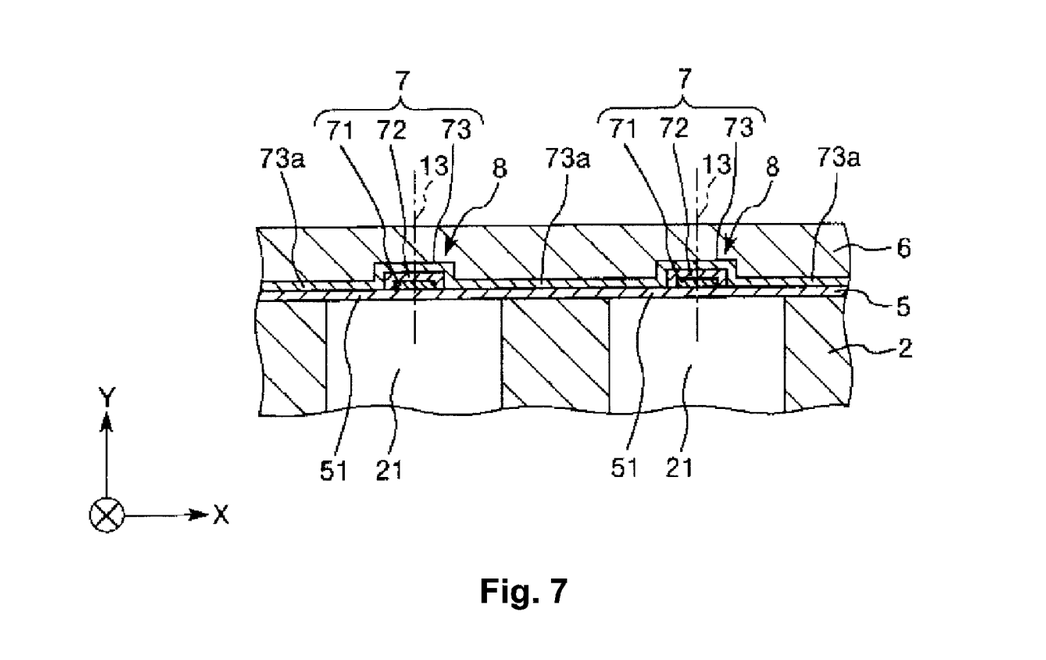
FIG. 7 is a cross sectional view of the ultrasonic transducer taken along the section line C-C shown in FIG. 2 and FIG. 6.

FIG. 1 is a perspective view of a first embodiment of an ultrasonic probe according to the present invention; FIG. 2 is a plan view showing an ultrasonic transducer (first embodiment) of the ultrasonic probe shown in FIG. 1; FIG. 3 is a cross sectional view taken along a section line A-A of FIG. 2; FIG. 4 is a cross sectional view (taken along a section line A-A in FIG. 2) for explaining the operation of the ultrasonic transducer shown in FIG. 2; FIG. 5 is a cross sectional view (taken along a section line B-B in FIG. 2) for explaining the operation of the ultrasonic transducer shown in FIG. 2; FIG. 6 is an enlarged plan view showing a portion of the ultrasonic transducer shown in FIG. 2; and FIG. 7 is a cross sectional view taken along the section line C-C shown in FIG. 2 and FIG. 6.

In the explanation that follows, the directional terms "upper," "lower," "right," and "left" are used as appropriate from the perspective of FIGS. 3-5 and 7 unless it is specified otherwise.

FIG. 2 depicts the ultrasonic transducer in a simplified manner and omits depictions of an acoustic matching section, an upper electrode, a lower electrode, an upper electrode lead conductor, and a portion of a lower electrode lead conductor. FIGS. 3 to 5 depict the ultrasonic transducer in a simplified manner and omit depictions of the upper electrode, the lower electrode, the upper electrode lead conductor, and the lower electrode lead conductor. In FIG. 6, a depiction of the acoustic matching section is omitted.

As shown in the figures, an X axis and a Y axis are assumed to intersect each other perpendicularly. In the present embodiment, the direction of the X axis (X-axis direction) corresponds to the first direction, and the direction of the Y axis (Y-axis direction), which is perpendicular to the first direction, corresponds to the second direction. The X-axis direction corresponds to an azimuth direction, and the Y-axis direction corresponds to a slice direction (same holds in the second to fourth embodiments).

As shown in FIG. 1, the ultrasonic probe 10 has a case 200 and an ultrasonic transducer 1 stored (housed) in the case 200. The ultrasonic transducer 1 is arranged in a tip end portion of the case 200. The ultrasonic probe 10 can, for example, be used as an ultrasonic probe of the diagnostic instrument 100 to be explained later or any of various other diagnostic instruments.

In this embodiment, a surface of the ultrasonic transducer 1, i.e., a surface of the acoustic matching section 6, is exposed to the outside. The acoustic matching section 6 functions as a protective layer of the ultrasonic probe 10 and the ultrasonic transducer 1. While there are no particular limitations on the material from which the acoustic matching section 6 is made, a material, e.g., silicone rubber, having an acoustic impedance substantially the same as a living body is used. It is also acceptable if the probe is configured such that the surface of the acoustic matching section 6 is not exposed to the outside.

In this embodiment, the ultrasonic probe 10 is a contact type sensor that is used by touching the surface of the acoustic matching section 6 against a living body of a test subject. That is, when a test subject is inspected, the ultrasonic probe 10 is used by contacting the surface of the acoustic matching section 6 against the living body of the test subject. In such a case, an ultrasonic wave is transmitted from the ultrasonic transducer 1 toward the acoustic matching section 6, and the ultrasonic wave passes through the acoustic matching section 6 and propagates to the interior of the living body. Then, an ultrasonic wave reflected at a prescribed part inside the living body passes through the acoustic matching section 6 and is received by the ultrasonic transducer 1.

The ultrasonic probe 10 is electrically connected with a cable 210 to a device main unit 300 (FIG. 13) of a diagnostic instrument 100 explained later.

As shown in FIG. 2 to FIG. 7, the ultrasonic transducer 1 includes a substrate 2 (first flexible substrate) having a flexible quality, a plurality of (twelve in the example shown in the drawings) ultrasonic elements (ultrasonic oscillators) 8 that are provided on the substrate 2 and serve to transmit and receive ultrasonic waves, an acoustic matching section 6 that is provided on the same side of the substrate as the ultrasonic elements 8 and serves to cover the ultrasonic elements 8, a substrate 3 (second flexible substrate) attached to the opposite side of the substrate 2 as the ultrasonic elements 8 and has a flexible quality, and a support substrate 4 that is attached to the opposite side of the substrate 3 as the substrate 2.

Although there are no particular limitations on the shapes of the substrate 2, the substrate 3, and the support substrate 4, in the example shown in the drawings the substrates are quadrilateral in a plan view (plan view as seen along a thickness direction of the substrate 2). Other examples of shapes that the substrate 2, the substrate 3, and the support substrate 4 might have in a plan view include pentagonal, hexagonal, other polygonal shapes, circular, and elliptical.

Also, while there are no particular limitations on the materials from which the substrate 2, the substrate 3, and the support substrate 4 are made, examples include silicon (Si) and other semiconductor materials. As a result, the substrates can be processed easily with etching and the like.

Each of the ultrasonic elements 8 includes a diaphragm 51 (FIG. 7) and a piezoelectric body 7, and the ultrasonic elements 8 are arranged on the substrate 2 in a matrix form. That is, a plurality of the ultrasonic elements 8 (four in the example shown in the drawings) are arranged along the X-axis direction and a plurality of the ultrasonic elements 8 (three in the example shown in the drawings) are arranged along the Y-axis direction. There are no particular limitations on the shape of the piezoelectric bodies 7; they are rectangular in a plan view in the example shown in the drawings. Other examples of shapes that the piezoelectric bodies 7 might have in a plan view include square and other quadrilateral shapes, pentagonal, hexagonal, other polygonal shapes, circular, and elliptical. The piezoelectric bodies 7 and the wiring thereof will be explained later.

Openings 21 are provided in the substrate 2 at positions corresponding to each of the ultrasonic elements 8, and each of the openings 21 is for forming the diaphragm 51 of one of the ultrasonic elements 8. There are no particular limitations on the shape of the openings 21; they are rectangular in a plan view in the example shown in the drawings. Other examples of shapes that the openings 21 might have in a plan view include square and other quadrilateral shapes, pentagonal, hexagonal, other polygonal shapes, circular, and elliptical.

A support film 5 is formed on the substrate 2 and each of the openings 21 is obstructed by the support film 5. The diaphragms 51 are formed by the regions of the support film 5 that obstruct the openings 21. The piezoelectric bodies 7 are provided on the diaphragms 51. While there are no particular limitations on the material from which the support film 5 is made, the support film 5 is, for example, a laminated body (two-layered structure) having a $SiO_2$ film and a $ZrO_2$ layer. The $SiO_2$ layer can be formed by applying a thermal oxidation process to the surface of the substrate 2 if the substrate 2 is made of Si. The $ZrO_2$ layer is formed on the $SiO_2$ layer using, for example, sputtering or another method. When, for example, PZT is used the material of a piezoelectric film 72 of the piezoelectric bodies 7 (explained later), the $ZrO_2$ layer serves to prevent the Pb of the PZT from diffusing into the $SiO_2$ layer. The $ZrO_2$ layer is also effective at improving a flexing efficiency of the support film 5 with respect to strain of the piezoelectric film 72.

Ribs (support sections) 41 that protrude toward the substrate 3 are provided on an outer peripheral portion of the support substrate 4, and the ribs 41 are attached to the substrate 3. As a result, a space 12 is formed between the support substrate 4 and the substrate 3. This space 12 functions as a space for the substrates 2 and 3 to escape into when the substrates 2 and 3 flex. As shown in FIG. 7, each of the piezoelectric bodies 7 has a lower electrode 71 formed on the diaphragm 51 (support film 5), a piezoelectric film 72 formed on the lower electrode 71, and an upper electrode 73 formed on the piezoelectric film 72.

As shown in FIG. 6, for example, lower electrode lead conductors 71a that extend along the Y-axis direction on the support film 5 are connected to the lower electrodes 71. The lower electrode lead conductors 71a serve as common lead conductors of ultrasonic elements 8 that are aligned along the Y-axis direction. That is, each of the lower electrode lead conductors 71a connects to the lower electrodes 71 of ultrasonic elements 8 that are arranged adjacent to one another along the Y-axis direction as shown in FIG. 6. As a result, groups of ultrasonic elements 8 arranged along the Y-axis direction can be driven independently.

As shown in FIG. 6, for example, upper electrode lead conductors 73a that extend along the X-axis direction on the support film 5 are connected to the upper electrodes 73. The upper electrode lead conductors 73a serve as common lead conductors of ultrasonic elements 8 that are aligned along the X-axis direction. That is, each of the upper electrode lead conductors 73a connects to the upper electrodes 73 of ultrasonic elements 8 that are arranged adjacent to one another along the X-axis direction as shown in FIG. 6, and end portions of the upper electrode lead conductors 73a are connected to, for example, ground GND. As a result, the upper electrodes 73 of the ultrasonic elements 8 are grounded. Conversely, it is also acceptable to connect the lower electrode lead conductors 71a to ground.

There are no particular limitations on the material from which the lower electrodes 71, the upper electrodes 73, the lower electrode lead conductors 71a, and the upper electrode lead conductors 73a are made so long as it is an electrically conductive material. For example, any of various metal materials can be used. It is acceptable for each of the lower electrodes 71, the upper electrodes 73, the lower electrode lead conductors 71a, and the upper electrode lead conductors 73a to be single layer structures or laminate structures made up of a plurality of stacked layers. As a concrete example, a laminated film made of Ti/Ir/Pt/Ti can be used as the lower electrodes 71 and the lower electrode lead conductors 71a, and an Ir film can be used as the upper electrodes 73 and the upper electrode lead conductors 73a.

The piezoelectric film 72 is formed by, for example, depositing PZT (lead zirconate titanate) in a film form. Although in this embodiment the piezoelectric film 72 is made of PZT, any material can be used that undergoes contraction (elongation and contraction) in a planar direction when a voltage is applied. Examples of materials other than PZT that can be used include lead titanate (PbTiO3), lead zirconate (PbZrO3), and lead lanthanum titanate ((Pb, La)TiO3).

Figure 13:
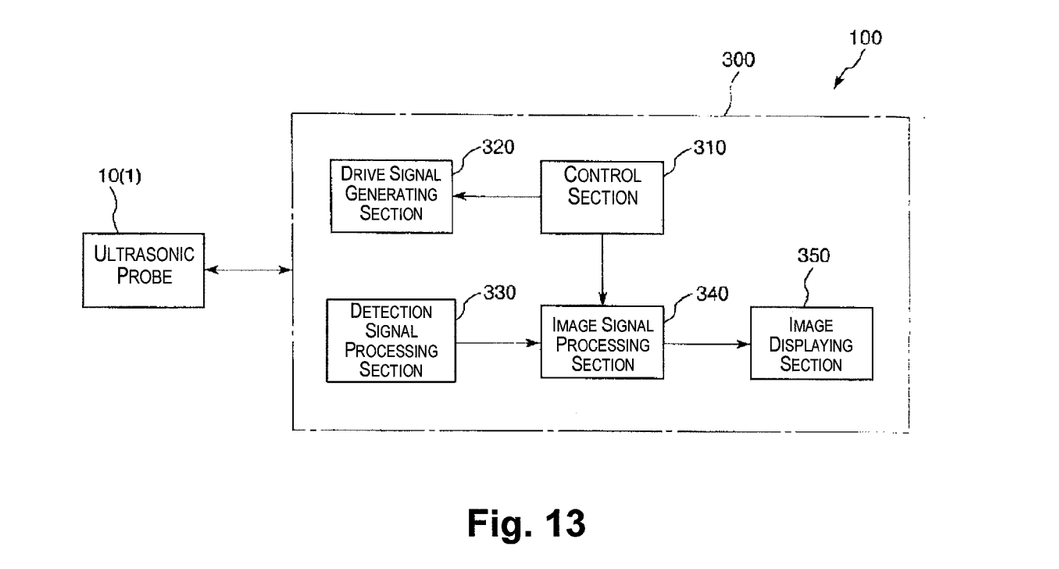
FIG. 13 is a block diagram showing an embodiment of a diagnostic instrument according to the present invention.

With such an ultrasonic element 8, the piezoelectric film 72 is made to elongate and contract in a planar direction by applying a voltage across the lower electrode 71 and the upper electrode 73 through, for example, a cable 210 from the device main unit 300 (see FIG. 13). One surface of the piezoelectric film 72 is attached to the support film 5 through the lower electrode 71 and the upper electrode 73 is formed on the other surface. Since there are no other layers formed on the upper electrode 73, it is more difficult for the support film 5 side of the piezoelectric film 72 to elongate and contract and easier for the upper electrode 73 side to elongate and contract. When a voltage is applied to the piezoelectric film 72, the piezoelectric film 72 deflects so that it is convex toward the opening 21 and causes the diaphragm 51 to deflect. Thus, by applying an alternating-current voltage to the piezoelectric film 72, it is possible to vibrate the diaphragm 51 in a film thickness direction and use the vibration of the diaphragm 51 to emit an ultrasonic wave.

When an ultrasonic wave is received by the ultrasonic element 8, the ultrasonic wave acts on the diaphragm 51 and the diaphragm 51 vibrates in the film thickness direction. In the ultrasonic element 8, the vibration of the diaphragm 51 causes a potential difference to develop between the surface of the piezoelectric film 72 facing the lower electrode 71 and the surface of the piezoelectric film 72 facing the upper electrode 73 and a reception signal (detection signal) (current) corresponding to the displacement amount of the piezoelectric film 72 is outputted from the upper electrode 73 and the lower electrode 71. This signal is transmitted to the device main unit 300 (see FIG. 13) through the cable 210, and a prescribed signal processing is executed at the device main unit 300 based on the signal. As a result, an ultrasonic image (electronic image) is generated and displayed at the device main body 300. With this ultrasonic probe 10, ultrasonic plane waves can be emitted in a desired direction by delaying and, thereby, offsetting the timing at which ultrasonic waves are emitted from ultrasonic elements 8 aligned along the X-axis direction.

As shown in FIG. 2 and FIG. 3, the transducer 1 has piezoelectric bodies (piezoelectric elements) 11a and 11b serving as a first substrate deforming section configured to flex (curve) the substrate 2 in the X-axis direction and piezoelectric bodies (piezoelectric elements) 11c and 11d serving as a second substrate deforming section configured to flex the substrate 2 in the Y-axis direction. Each of the piezoelectric bodies 11a, 11b, 11c, 11d has a piezoelectric film, an upper electrode, and a lower electrode. The constituent features of these parts are the same as in the previously explained piezoelectric body 7, and, therefore, an explanation of the constituent features is omitted. The piezoelectric bodies 11a, 11b, 11c, 11d constitute a substrate deforming part.

Assuming there is a line segment 13 perpendicular to the ultrasonic wave emission surface of each of the ultrasonic elements 8, the piezoelectric bodies 11a and 11b serve as a means of flexing the substrate 2 in the X-axis direction and changing the direction of the line segment 13 of at least one of the ultrasonic elements 8. That is, the piezoelectric bodies 11a and 11b serve to flex the substrate 2 in the X-axis direction and change the relative direction (direction of the line segment 13) and position of at least two of the ultrasonic elements 8.

Meanwhile, the piezoelectric bodies 11c and 11d serve to flex the substrate 2 in the Y-axis direction and change the direction of the line segment 13 of at least one of the ultrasonic elements 8. That is, the piezoelectric bodies 11c and 11d serve to flex the substrate 2 in the Y-axis direction and change the relative direction (direction of the line segment 13) and position of at least two of the ultrasonic elements 8. Here, "emission surface" refers to the surface (face) on the side of the ultrasonic element 8 from which ultrasonic waves are emitted. More specifically, the "emission surface" is the surface of the diaphragm 51 of an ultrasonic element 8 that faces the piezoelectric body 7 (upper surface in FIG. 7).

The expression "flex in the X-axis direction (first direction)" means that the cross sectional shape of the substrate 2 (first substrate) is curved, i.e., flexed, upward or downward (from the perspective of FIG. 4) when viewed along the Y-axis direction (second direction), which is perpendicular to (intersects with) the X-axis direction, as shown in FIG. 4. The expression "flex in the Y-axis direction (second direction)" means that the cross sectional shape of the substrate 2 is curved, i.e., flexed, upward or downward (from the perspective of FIG. 5) when viewed along the X-axis direction (first direction), which is perpendicular to (intersects with) the Y-axis direction, as shown in FIG. 5.

The piezoelectric bodies 11a, 11b, 11c, and 11d are provided on the support film 5 (substrate 2). The piezoelectric bodies 11a, 11b, 11c, and 11d can be formed during the same process as when the piezoelectric bodies 7 are formed. The piezoelectric bodies 11a, 11b, 11c, and 11d are arranged on an outer peripheral portion of the substrate 2 in positions farther outward then a region 14 where the ultrasonic elements 8 are arranged on the substrate 2.

Although there are no particular limitations on the shapes of the piezoelectric bodies 11a, 11b, 11c, and 11d, they are rectangular in a plan view in the example shown in the drawings. Other examples of shapes that the piezoelectric bodies 11a, 11b, 11c, and 11d might have in a plan view include square and other quadrilateral shapes, pentagonal, hexagonal, other polygonal shapes, circular, and elliptical. The piezoelectric body 11a is arranged on the right side of the region 14 from the perspective of FIG. 2 such that its long dimension is aligned with the Y-axis, and the piezoelectric body 11b is arranged on the left side of the region 14 from the perspective of FIG. 2 such that its long dimension is aligned with the Y-axis. The piezoelectric body 11c is arranged on the upper side of the region 14 from the perspective of FIG. 2 such that its long dimension is aligned with the X-axis, and the piezoelectric body 11d is arranged on the lower side of the region 14 from the perspective of FIG. 2 such that its long dimension is aligned with the X-axis. Electric power sources 220a, 220b, 220c, and 220d are provided in the device main unit 300 and connected through the cable 210 to the piezoelectric bodies 11a, 11b, 11c, and 11d, respectively.

Operation of the ultrasonic transducer 1 of the ultrasonic probe 10 will now be explained. When a direct-current voltage is applied to each of the piezoelectric bodies 11a and 11b from the electric power sources 220a and 220b, the piezoelectric bodies 11a and 11b contract and cause the substrates 2 and 3 to flex (curve) in the X-axis direction such that the sides of the substrates 2 and 3 that face away from the support substrate 4 become concave. As a result, the directions (attitudes) of the line segments 13 of the ultrasonic elements 8 change. That is, the line segments 13 of a group of ultrasonic elements 8 arranged along the X-axis direction are made to intersect at a prescribed position such that a focal point is formed.

If the voltage values of the direct-current voltages applied to the piezoelectric bodies 11a and 11b are changed, then the degree of contraction of the piezoelectric bodies 11a and 11b changes and the degree of flexing (curving) of the substrates 2 and 3 changes. As a result, the directions of the line segments 13 of the ultrasonic elements 8 are changed and the position of the focal point is changed. In this way, the position of the focal point can be adjusted. When a direct-current voltage is applied to each of the piezoelectric bodies 11c and 11d from the electric power sources 220c and 220d, the piezoelectric bodies 11c and 11d contract and cause the substrates 2 and 3 to flex in the Y-axis direction such that the sides of the substrates 2 and 3 that face away from the support substrate 4 become concave. As a result, the directions of the line segments 13 of the ultrasonic elements 8 change. That is, the line segments 13 of a group of ultrasonic elements 8 arranged along the Y-axis direction are made to intersect at a prescribed position such that a focal point is formed.

If the voltage values of the direct-current voltages applied to the piezoelectric bodies 11c and 11d is changed, then the degree of contraction of the piezoelectric bodies 11c and 11d changes and the degree of flexing of the substrates 2 and 3 changes. As a result, the directions of the line segments 13 of the ultrasonic elements 8 are changed and the position of the focal point is changed. In this way, the position of the focal point can be adjusted. When a direct-current voltage is applied to each of the piezoelectric bodies 11a, 11b, 11c, and 11d from the electric power sources 220a, 220b, 220c, and 220d, the piezoelectric bodies 11a, 11b, 11c, and 11d contract and cause the substrates 2 and 3 to flex in the X-axis direction and the Y-axis direction such that the sides of the substrates 2 and 3 that face away from the support substrate 4 become concave. As a result, the directions of the line segments 13 of the ultrasonic elements 8 change. That is, the line segments 13 of a group of ultrasonic elements 8 arranged along the X-axis direction intersect at a prescribed position such that a focal point is formed, and the line segments 13 of a group of ultrasonic elements 8 arranged along the Y-axis direction intersect at a prescribed position such that a focal point is formed.

If the voltage values of the direct-current voltages applied to the piezoelectric bodies 11a, 11b, 11c, and 11d are changed, then the degree of contraction of the piezoelectric bodies 11a, 11b, 11c, and 11d changes and the degrees of flexing of the substrates 2 and 3 in both the X-axis direction and the Y-axis direction changes As a result, the directions of the line segments 13 of the ultrasonic elements 8 are changed and the position of the focal point is changed. In this way, the position of the focal point can be adjusted in the second direction.

If the surface of the substrate 2 becomes warped or arched, then the operation of deforming the substrates 2 and 3 using the piezoelectric bodies 11a, 11b, 11c, and 11d can be used to correct the surface shape. It is also acceptable to omit the substrate 3. Also, any of the ultrasonic transducers 1 according to the second to fourth embodiments explained later can be used in the ultrasonic probe 10.

Second Embodiment

Figure 8:
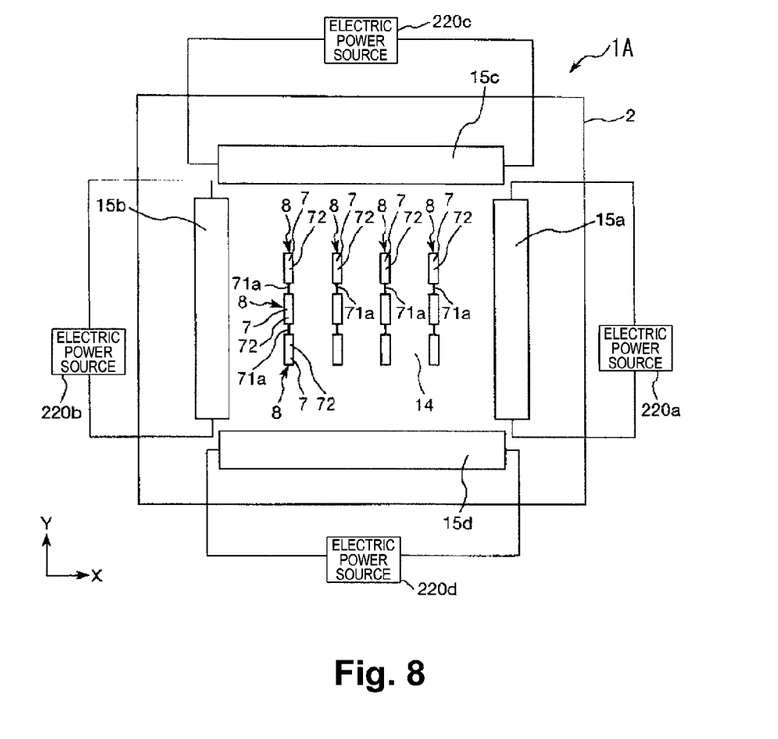
FIG. 8 is a plan view of an ultrasonic transducer according to a second embodiment of the present invention.

FIG. 8 is a plan view showing a second embodiment of an ultrasonic transducer 1A according to the present invention. In the explanation that follows, the directional terms "upper," "lower," "right," and "left" are used in the same manner as the first embodiment unless it is specified otherwise. FIG. 8 shows the ultrasonic transducer in a simplified manner and omits depictions of the acoustic matching section, the upper electrode, the lower electrode, the upper electrode lead conductor, and a portion of the lower electrode lead conductor.

The second embodiment will be explained focusing on the differences with respect to the previously explained first embodiment and explanations of parts that are the same will be omitted. As shown in FIG. 8, the ultrasonic transducer 1A according to the second embodiment has heating parts (a substrate heating section) 15a and 15b that serve as a first substrate deforming section and are configured to heat and expand the substrate 2. The ultrasonic transducer 1A also has heating parts (a substrate heating section) 15c and 15d that serve as a second substrate deforming section and are configured to heat and expand the substrate 2. There are no particular limitations on the heating parts 15a, 15b, 15c, and 15d so long as they can heat the substrate 2. For example, a heating element can be used. The heating parts 15a, 15b, 15c, and 15d constitute a substrate deforming part.

The heating parts 15a, 15b, 15c, and 15d are provided on the support film 5 (substrate 2). The heating parts 15a, 15b, 15c, and 15d can be formed during the same process as when the lower electrode lead conductors 71a and the upper electrode lead conductors 73a are formed. The heating parts 15a, 15b, 15c, and 15d are arranged on an outer peripheral portion of the substrate 2 in positions farther outward then a region 14 where the ultrasonic elements 8 are arranged on the substrate 2.

Although there are no particular limitations on the shapes of the heating parts 15a, 15b, 15c, and 15d, they are rectangular in a plan view in the example shown in the drawing. Other examples of shapes that the heating parts 15a, 15b, 15c, and 15d might have in a plan view include square and other quadrilateral shapes, pentagonal, hexagonal, other polygonal shapes, circular, and elliptical. The heating part 15a is arranged on the right side of the region 14 from the perspective of FIG. 8 such that its long dimension is aligned with the Y-axis, and the heating part 15b is arranged on the left side of the region 14 from the perspective of FIG. 8 such that its long dimension is aligned with the Y-axis. The heating part 15c is arranged on the upper side of the region 14 from the perspective of FIG. 8 such that its long dimension is aligned with the X-axis, and the heating part 15d is arranged on the lower side of the region 14 from the perspective of FIG. 8 such that its long dimension is aligned with the X-axis. Electric power sources 220a, 220b, 220c, and 220d are provided in the device main unit 300 and connected through the cable 210 to the heating parts 15a, 15b, 15c, 15d, respectively.

The operation of the ultrasonic transducer 1A will now be explained. When a direct current voltage is applied to each of the heating parts 15a and 15b from the electric power sources 220a and 220b, the heating parts 15a and 15b heat the substrate 2 and cause it to expand. Consequently, the substrates 2 and 3 flex in the X-axis direction such that the sides of the substrates 2 and 3 that face away from the support substrate 4 become convex. As a result, the directions (attitudes) of the line segments 13 of the ultrasonic elements 8 change.

If the voltage values of the direct-current voltages applied to the heating parts 15a and 15b are changed, then the heating temperatures of the heating parts 15a and 15b change, the degree of expansion of the substrate 2 changes, and the degree of flexing of the substrates 2 and 3 changes. As a result, the directions of the line segments 13 of the ultrasonic elements 8 change. When a direct current voltage is applied to each of the heating parts 15c and 15d from the electric power sources 220c and 220d, the heating parts 15c and 15d heat the substrate 2 and cause it to expand. As a result, the substrates 2 and 3 flex in the Y-axis direction such that the sides of the substrates 2 and 3 that face away from the support substrate 4 become convex. As a result, the directions of the line segments 13 of the ultrasonic elements 8 change.

If the voltage values of the direct-current voltages applied to the heating parts 15c and 15d are changed, then the heating temperature of the heating parts 15c and 15d change, the degree of expansion of the substrate 2 changes, and the degree of flexing of the substrates 2 and 3 changes. As a result, the directions of the line segments 13 of the ultrasonic elements 8 change. When a direct-current voltage is applied to each of the heating parts 15a, 15b, 15c, and 15d from the electric power sources 220a, 220b, 220c, and 220d, the heating parts 15a, 15b, 15c, and 15d heat the substrate 2 and cause it to expand. Consequently, the substrates 2 and 3 to flex in the X-axis direction and the Y-axis direction such that the sides of the substrates 2 and 3 that face away from the support substrate 4 become convex. As a result, the directions of the line segments 13 of the ultrasonic elements 8 change.

If the voltage values of the direct-current voltages applied to the heating parts 15a, 15b, 15c, and 15d is changed, then the heating temperature of the piezoelectric the heating parts 15a, 15b, 15c, and 15d changes, the degree of expansion of the substrate 2 changes, and the degrees of flexing of the substrates 2 and 3 in both the X-axis direction and the Y-axis direction change. As a result, the directions of the line segments 13 of the ultrasonic elements 8 change. With this ultrasonic transducer 1A, it is also possible to correct warping and arching of the surface of the substrate 2. It is also acceptable to omit the substrate 3.

Third Embodiment

Figure 9:
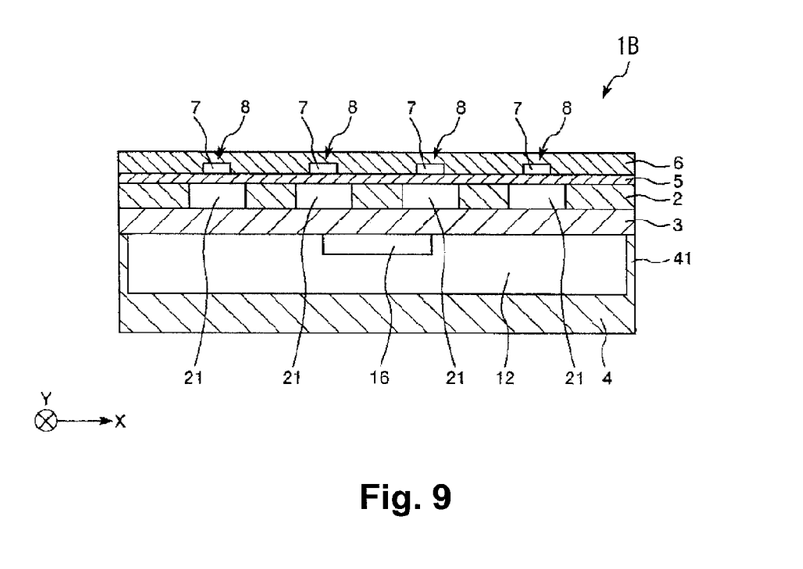
FIG. 9 is a cross sectional view of an ultrasonic transducer according to a third embodiment of the present invention.
Figure 10:
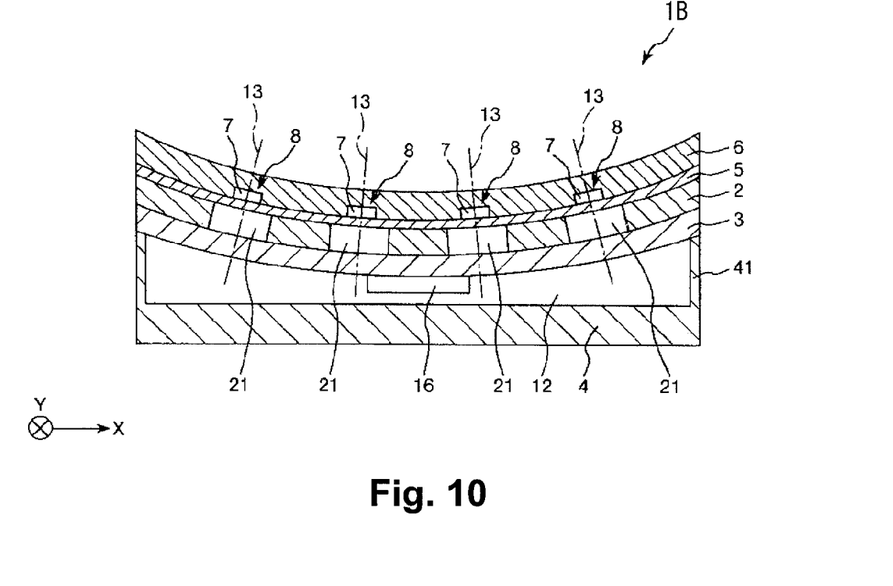
FIG. 10 is a cross sectional view of the ultrasonic transducer shown in FIG. 9 for explaining operation of the ultrasonic transducer according to the third embodiment.

FIG. 9 is a cross sectional view of an ultrasonic transducer 1B according to a third embodiment of the present invention, and FIG. 10 is a cross sectional view for explaining operation of the ultrasonic transducer 1B shown in FIG. 9. In the explanation that follows, the directional terms "upper," "lower," "right," and "left" are used as appropriate from the perspective of FIG. 9 and FIG. 10 unless it is specified otherwise.

FIG. 9 and FIG. 10 show the ultrasonic transducer in a simplified manner and omit depictions of the upper electrode, the lower electrode, the upper electrode lead conductor, and the lower electrode lead conductor. The third embodiment will be explained focusing on the differences with respect to the previously explained first embodiment and explanations of parts that are the same will be omitted. As shown in FIG. 9, the ultrasonic transducer 1B according to the third embodiment has a heating part (a substrate heating unit) 16 that heats and expands the substrate 3 to serve as a substrate deforming part. The heating part 16 causes the substrate 2 to flex by expanding and flexing the substrate 3. There are no particular limitations on the heating part 16 so long as it can heat the substrate 3. For example, a heating element can be used.

The heating part 16 is provided on the surface of the substrate 3 that faces the support substrate 4. The heating part 16 is arranged in a middle portion of the substrate 3. There are no particular limitations on the shape of the heating part 16. The coefficient of thermal expansion of the substrate 3 is set to be larger than the coefficient of thermal expansion of the substrate 2. As a result, when the heating part 16 heats the substrate 3 and causes it to expand, the degree of expansion of the substrate 3 is larger than the degree of expansion of the substrate 2. As a result, the substrate 2 flexes in the X-axis direction and the Y-axis direction such that the side of the substrate 2 that faces away from the support substrate 4 becomes concave. The heating part 16 is connected via a cable 210 to an electric power source (not shown) provided in the device main unit 300.

The operation of the ultrasonic transducer 1B will now be explained. When a direct-current voltage is applied to the heating part 16, the heating part 16 heats the substrate 3 and causes it to expand. As a result, as shown in FIG. 10, the substrate 2 and the substrate 3 flex in the X-axis direction and the Y-axis direction such that the side facing away from the support substrate 4 becomes concave. As a result, the directions (attitudes) of the line segments 13 of the ultrasonic elements 8 change. That is, the line segments 13 of a group of ultrasonic elements 8 arranged along the X-axis direction intersect at a prescribed position such that a focal point is formed, and the line segments 13 of a group of ultrasonic elements 8 arranged along the Y-axis direction intersect at a prescribed position such that a focal point is formed.

When the voltage value of the direct-current voltage applied to the heating part 16 is changed, the heating temperature of the heating part 16 changes. Consequently, the degree of expansion of the substrate 3 changes and the degree of flexing of the substrates 2 and 3 in the X-axis direction and the Y-axis direction. As a result, the directions of the line segments 13 of the ultrasonic elements 8 change. In this way, the position of the focal point can be adjusted in the second direction. If the surface of the substrate 2 becomes warped or arched, then the operation of deforming the substrates 2 and 3 using the heating part 16 can be used to correct the surface shape.

Fourth Embodiment

Figure 11:
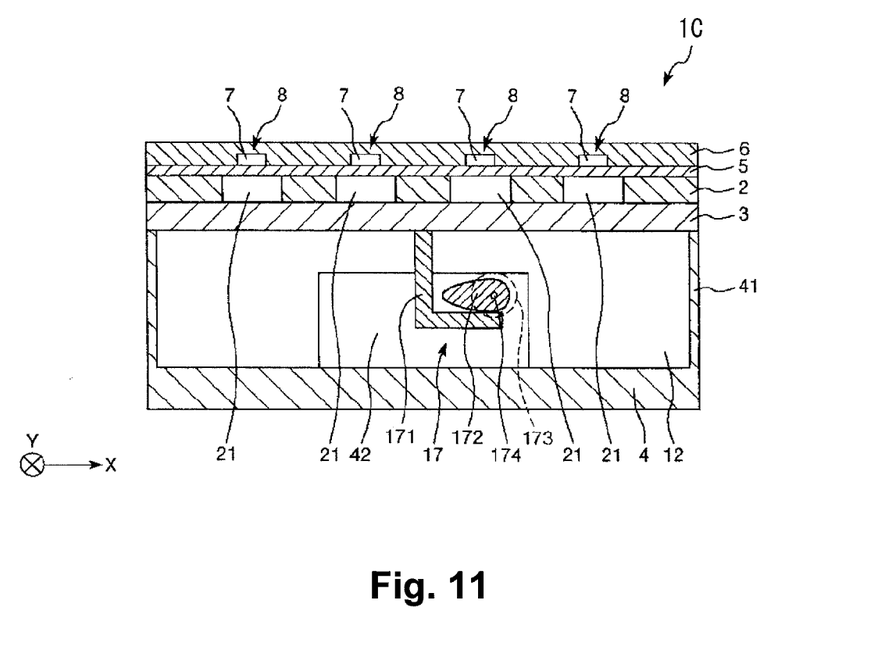
FIG. 11 is a cross sectional view of an ultrasonic transducer according to a fourth embodiment of the present invention.
Figure 12:
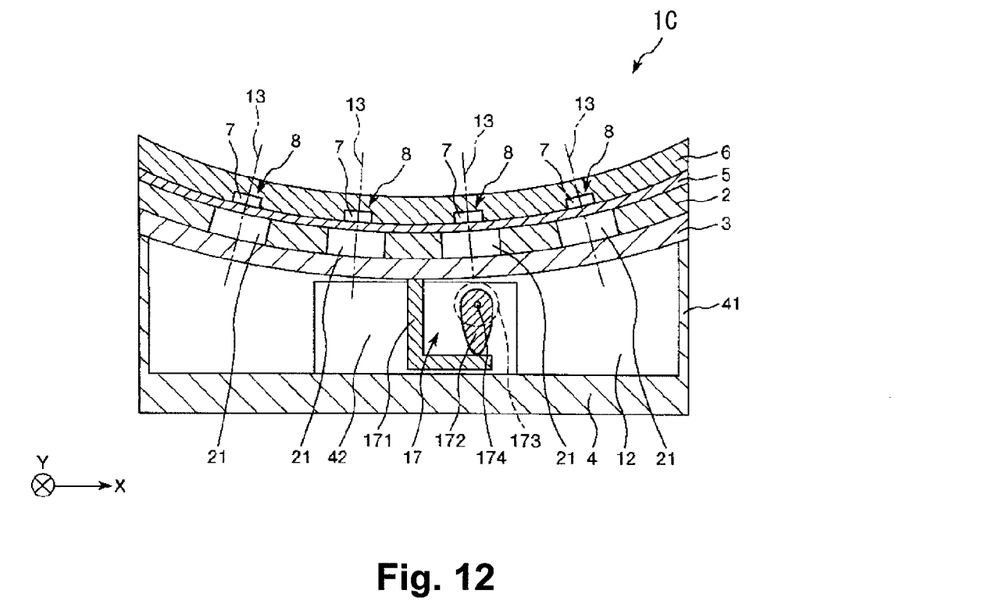
FIG. 12 is a cross sectional view of the ultrasonic transducer shown in FIG. 11 for explaining operation of the ultrasonic transducer according to the fourth embodiment.

FIG. 11 is a cross sectional view of an ultrasonic transducer 1C according to a fourth embodiment of the present invention, and FIG. 12 is a cross sectional view for explaining operation of the ultrasonic transducer 1C shown in FIG. 11. In the explanation that follows, the directional terms "upper," "lower," "right," and "left" are used as appropriate from the perspective of FIG. 11 and FIG. 12 unless it is specified otherwise. FIG. 11 and FIG. 12 show the ultrasonic transducer in a simplified manner and omit depictions of the upper electrode, the lower electrode, the upper electrode lead conductor, and the lower electrode lead conductor.

The fourth embodiment will be explained focusing on the differences with respect to the previously explained first embodiment and explanations of parts that are the same will be omitted. As shown in FIG. 11, the ultrasonic transducer 1C according to the fourth embodiment has a pulling mechanism 17 configured to pull a middle portion of the substrate 3 toward a side opposite the side where substrate 2 is disposed and thereby serve as a substrate deforming part. The pulling mechanism 17 causes the substrate 2 to flex by pulling and flexing the substrate 3.

There are no particular limitations on the pulling mechanism 17 and any mechanism that can pull a middle portion of the substrate 3 toward the opposite side as the side where the substrate 2 is located is acceptable. In this embodiment, a cam mechanism is used. That is, the pulling mechanism 17 has a support member 171, a cam 172, and a motor 173. The pulling mechanism 17 will now be explained. The support member 171 is provided on the surface of the substrate 3 that faces the support substrate 4. The support member 171 is L-shaped in the example shown in the drawings and is attached to the middle portion of the substrate 3.

The cam 172 is installed such that it can rotate (turn) on a wall section 42 formed on a middle portion of the support substrate 4. This cam 172 is arranged directly above a support member 171. A rotary shaft 174 of the motor 173 is fixed to the cam 172. When the motor 173 is driven and the rotary shaft 174 rotates, the cam 172 rotates together with the rotary shaft 174. The motor 173 is connected via a cable 210 to a drive control section (not shown) of the motor 173 provided in the device main unit 300.

The operation of the ultrasonic transducer 1C will now be explained.

When the drive control section applies a drive voltage to the pulling mechanism 17, the motor 173 operates and rotates the cam 172 (see FIG. 12). As a result, the cam 172 pushes and moves the support member 171 toward the support substrate 4. As a result, the support member 171 causes the middle portion of the substrate 3 to be pulled toward the support substrate 4 such that the substrates 2 and 3 flex in the X-axis direction and the Y-axis direction and become concave on the side opposite the support substrate 4. As a result, the directions (attitudes) of the line segments 13 of the ultrasonic elements 8 change. That is, the line segments 13 of a group of ultrasonic elements 8 arranged along the X-axis direction intersect at a prescribed position such that a focal point is formed, and the line segments 13 of a group of ultrasonic elements 8 arranged along the Y-axis direction intersect at a prescribed position such that a focal point is formed.

As shown in FIG. 12, if the cam 172 rotates further, then the cam 172 pushes and moves the support member 171 further toward the support substrate 4. As a result, the support member 171 pulls the middle portion of the substrate 3 further toward the support substrate 4 and the degree of flexing of the substrates 2 and 3 in the X-axis direction and the Y-axis direction changes. As a result, the directions of the line segments 13 of the ultrasonic elements 8 change. In this way, the position of the focal point can be adjusted in the second direction.

If the surface of the substrate 2 becomes warped or arched, then the operation of deforming the substrates 2 and 3 using the pulling mechanism 17 can be used to correct the surface shape.

Embodiment of Diagnostic Instrument (Electronic Instrument)

The ultrasonic probe 10 and the ultrasonic transducers 1 to 1C explained heretofore can be used favorably in, for example, a diagnostic instrument or other electronic instrument. An embodiment of a diagnostic instrument will now be explained as a representative embodiment of an electronic instrument.

FIG. 13 is a block diagram showing an embodiment of a diagnostic instrument according to the present invention. As shown in FIG. 13, the diagnostic instrument 100 includes the previously explained ultrasonic probe 10 and a device main unit 300 that is electrically connected to the ultrasonic probe 10 via a cable 210. The device main unit 300 includes a control section (control unit) 310, a drive signal generating section 320, a detection signal processing section 330, an image signal processing section 340, and an image displaying section (displaying unit) 350. The detection signal processing section 330 and the image signal processing section 340 constitute a signal processing section. The control section 310 includes, for example, a microcomputer and serves to control the drive signal generating section 320, the image signal processing section 340, and the entire device main unit 300. The image displaying section 350 includes, for example, a CRT, LCD, or other display device.

The operation of the diagnostic instrument 100 will now be explained.

When an inspection is to be conducted, the surface of the acoustic matching section 6 of the ultrasonic probe 10 is touched against the living body of a test subject and the diagnostic instrument 100 is operated. First, the control section 310 sends a transmission command to the drive signal generating section 320 and the drive signal generating section 320 transmits drive signals for driving each of the ultrasonic elements 8 to the ultrasonic elements 8 at prescribed timings. As a result, each of the ultrasonic elements 8 is driven at a prescribed timing. In this way, an ultrasonic wave is emitted from the ultrasonic transducer of the ultrasonic probe 10.

The ultrasonic wave generated propagates to the interior of the living body, is reflected at a prescribed part inside the living body, and is received by the ultrasonic transducer of the ultrasonic probe 10. The ultrasonic transducer then outputs a detection signal corresponding to the received ultrasonic wave. This detection signal is transmitted through the cable 210 to the detection signal processing section 330 of the device main unit 300. The detection signal processing section 330 executes a prescribed signal processing, and an A/D converter (not shown) included in the detection signal processing section 330 converts the signal to a digital signal.

Digital signal outputted from the detection signal processing section 330 is fed to the image signal processing section 340 and stored sequentially as plane data in a primary storage section (not shown) included in the image signal processing section 340 while being synchronized with a frame timing signal. Based on the plane data, the image signal processing section 340 reconstructs two-dimensional or three-dimensional image data and applies such image processing as, for example, interpolation, response enhancement processing, gradation processing to the image data. After being subjected to the image processing, the image data is stored in a secondary storage section (not shown) included in the image signal processing section 340.

The processed image data is then read from the secondary storage section of the image signal processing section 340 and fed to the image displaying section 350. The image displaying section 350 displays an image based on the image data. A doctor or other medical professional can view the image displayed on the image displaying section 350 and make a diagnosis.

Although an ultrasonic transducer, an ultrasonic probe, a diagnostic instrument, and an electronic instrument according to the present invention are explained herein based on the embodiments depicted in the drawings, the present invention is not limited to these embodiments and any of the constituent parts can be replaced with other constituent parts having the same functions. It is also acceptable to add other constituent parts to the present invention as desired.

Also, in the present invention, it is acceptable to combine two or more constituent parts (features) of the different embodiments as desired. The ultrasonic transducer according to the present invention is not limited to being used in an ultrasonic probe configured to operate while contacting a test subject. The ultrasonic transducer can also be used in a non-contact type sensor, e.g., a proximity sensor, that operates without contacting the test subject.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An ultrasonic transducer comprising:
a first flexible substrate that has a plurality of openings;
a plurality of ultrasonic elements disposed on the first flexible substrate, and configured and arranged to transmit and receive ultrasonic waves;
a substrate deforming part configured and arranged to flex the first flexible substrate in a first direction and in a second direction that intersects with the first direction;
a power source configured and arranged to apply a voltage to the substrate deforming part; and
a support film disposed between the ultrasonic elements and the first flexible substrate,
the substrate deforming part being further configured and arranged to change a degree of flexing of the first flexible substrate according to the voltage applied from the power source,
the ultrasonic elements being disposed on the support film at locations corresponding to the openings, respectively, as viewed in a third direction perpendicular to the first and the second directions, and
the substrate deforming part being disposed on the support film so as not to overlap the openings as viewed in the third direction.

2. The ultrasonic transducer according to claim 1, wherein the substrate deforming part includes a first deforming section configured and arranged to flex the first flexible substrate in the first direction, and a second deforming section configured and arranged to flex the first flexible substrate in the second direction.

3. The ultrasonic transducer according to claim 2, wherein each of the first deforming section and the second deforming section includes a piezoelectric element configured and arranged to elongate or contract to flex the first flexible substrate.

4. The ultrasonic transducer according to claim 1, wherein the substrate deforming part is configured and arranged to flex the first flexible substrate in at least one of the first direction and the second direction such that a direction normal to an emission surface of at least one of the ultrasonic elements changes.

5. The ultrasonic transducer according to claim 1, wherein the substrate deforming part is configured and arranged to flex the first flexible substrate in at least one of the first direction and the second direction such that a relative direction between each direction normal to an emission surface of at least two of the ultrasonic elements changes.

6. The ultrasonic transducer according to claim 1, further comprising
a second flexible substrate attached to one side of the first flexible substrate opposite from a side the ultrasonic elements,
the substrate deforming part being configured and arranged to flex the second flexible substrate in order to flex the first flexible substrate.

7. The ultrasonic transducer according to claim 1, wherein the ultrasonic elements are aligned along the first direction.

8. The ultrasonic transducer according to claim 1, wherein the ultrasonic elements are aligned along the second direction.

9. The ultrasonic transducer according to claim 1, wherein the first direction is perpendicular to the second direction.

10. An ultrasonic probe comprising:
the ultrasonic transducer according to claim 1; and
a case in which the ultrasonic transducer is housed.

11. A diagnostic instrument comprising:
the ultrasonic transducer according to claim 1;
a case in which the ultrasonic transducer is housed;
a device main unit having a signal processing section configured to execute signal processing based on a signal transmitted from the ultrasonic transducer to generate image data; and
an image display section configured and arranged to display an image based on the image data.

12. An electronic instrument comprising:
the ultrasonic transducer according to claim 1; and
a case in which the ultrasonic transducer is housed;
a device main unit having a signal processing section configured to execute signal processing based on a signal transmitted from the ultrasonic transducer.

13. An ultrasonic transducer comprising:
a first flexible substrate;
a plurality of ultrasonic elements disposed on the first flexible substrate, and configured and arranged to transmit and receive ultrasonic waves; and
a substrate deforming part configured and arranged to flex the first flexible substrate in a first direction and in a second direction that intersects with the first direction, the substrate deforming part including a first deforming section configured and arranged to flex the first flexible substrate in the first direction and a second deforming section configured and arranged to flex the first flexible substrate in the second direction, each of the first deforming section and the second deforming section including a substrate heating section configured and arranged to heat and expand the first flexible substrate.

14. The ultrasonic transducer according to claim 13, wherein
the substrate deforming part is provided farther outward than a region where the ultrasonic elements are arranged in a plan view as viewed along a thickness direction of the first flexible substrate.

15. An ultrasonic transducer comprising:
a first flexible substrate;
a plurality of ultrasonic elements disposed on the first flexible substrate, and configured and arranged to transmit and receive ultrasonic waves;
a substrate deforming part configured and arranged to flex the first flexible substrate in a first direction and in a second direction that intersects with the first direction;

a power source configured and arranged to apply a voltage to the substrate deforming part; and a second flexible substrate attached to one side of the first flexible substrate opposite from a side the ultrasonic elements, the substrate deforming part being further configured and arranged to change a degree of flexing of the first flexible substrate according to the voltage applied from the power source, the substrate deforming part including a pulling mechanism configured and arranged to pull a center portion of the second flexible substrate toward a direction away from the first flexible substrate in order to flex the first flexible substrate, the substrate deforming part including as the pulling mechanism includes a cam configured and arranged to rotate and a motor configured and arranged to be driven by the voltage to rotate the cam, and the degree of flexing of the first flexible substrate being changed according to rotation of the cam.

* * * * *